United States Patent
Yashiro et al.

(10) Patent No.: US 11,285,956 B2
(45) Date of Patent: Mar. 29, 2022

(54) VEHICLE CONTROL DEVICE

(71) Applicant: HONDA MOTOR CO., LTD., Tokyo (JP)

(72) Inventors: Katsuya Yashiro, Wako (JP); Tadahiko Kanoh, Wako (JP); Kanta Tsuji, Wako (JP); Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 16/803,034

(22) Filed: Feb. 27, 2020

(65) Prior Publication Data
US 2020/0282998 A1    Sep. 10, 2020

(30) Foreign Application Priority Data

Mar. 6, 2019   (JP) .............................. JP2019-040865

(51) Int. Cl.
*B60W 50/14*      (2020.01)
*B60W 30/18*      (2012.01)

(52) U.S. Cl.
CPC ...... *B60W 30/18163* (2013.01); *B60W 50/14* (2013.01); *B60W 2554/4049* (2020.02)

(58) Field of Classification Search
CPC ........... B60W 30/18163; B60W 50/14; B60W 2554/4049; B60W 2556/50; B60W 2554/4045; B60W 2420/52
See application file for complete search history.

(56) References Cited

U.S. PATENT DOCUMENTS

| | | | |
|---|---|---|---|
| 10,343,686 B2 | 7/2019 | Hashimoto et al. | |
| 2018/0043897 A1 | 2/2018 | Hashimoto et al. | |
| 2018/0147984 A1* | 5/2018 | Himi ................. | B62D 15/0255 |

FOREIGN PATENT DOCUMENTS

| | | | |
|---|---|---|---|
| CN | 108460980 A | * | 8/2018 |
| JP | 2016004425 A | * | 1/2016 |
| JP | 2018-025977 A | | 2/2018 |

OTHER PUBLICATIONS

English_Translation_JP2016004425A (Year: 2016).*
English_Translation_CN108460980A (Year: 2018).*

* cited by examiner

*Primary Examiner* — Peter D Nolan
*Assistant Examiner* — Ashley L Redhead, Jr.
(74) *Attorney, Agent, or Firm* — Thomas | Horstemeyer, LLP

(57) ABSTRACT

The present invention provides a vehicle control device that performs travel control of a vehicle, comprising: a detection unit capable of detecting a situation around the vehicle; and a control unit for controlling the vehicle based on a detection result in the detection unit, wherein based on a fact that lane change of another vehicle that is performed between a first lane in which the vehicle is traveling and a second lane adjacent to the first lane is detected by the detection unit, the control unit changes an operation condition on an occupant for permitting lane change of the vehicle intended by the occupant.

9 Claims, 5 Drawing Sheets

| LEVEL OF PERMISSION CONDITION | OPERATION TIME PERIOD OF DIRECTION INDICATOR |
|---|---|
| LEVEL 5 | 0.2 seconds |
| LEVEL 4 | 0.5 seconds |
| LEVEL 3 | 1 second |
| LEVEL 2 | 2 seconds |
| LEVEL 1 | 4 seconds |

VEHICLE CONTROL DEVICE

CROSS-REFERENCE TO RELATED APPLICATIONS

This application claims priority to and the benefit of Japanese Patent Application No. 2019-040865 filed on Mar. 6, 2019, the entire disclosure of which is incorporated herein by reference.

BACKGROUND OF THE INVENTION

Field of the Invention

The present invention relates to a control technique for a vehicle.

Description of the Related Art

Japanese Patent Laid-Open No. 2018-25977 discloses a method of automatically performing lane change or suggesting a lane change to a driver, based on the frequency of entry of another vehicle from a lane adjacent to a self-vehicle travel lane to the self-vehicle travel lane, and the frequency of exit of another vehicle from the self-vehicle travel lane to the adjacent lane. Specifically, control of automated driving is performed, in which when the frequency of entry of another vehicle is high, the adjacent lane is not selected as the travel lane, and when the frequency of exit of another vehicle is high, lane change to the adjacent lane is automatically performed or is proposed to the driver.

As one of the control techniques for a vehicle, there is known a technique called auto lane changing (ALC; Auto Lane Changing) that controls lane change of a vehicle while reflecting an intention of an occupant (driver, for example). When the occupant performs a specific operation, in the ALC technique like this, lane change intended by the occupant is permitted and the lane change is performed. However, there may be the case where lane change that reflects the intention of an occupant is not suitable, such as the case in which although other vehicles perform lane change to avoid an obstacle, the occupant intends to perform lane change to the lane in which the other vehicles were traveling before the lane change.

SUMMARY OF THE INVENTION

The present invention gives a permission suitable for a situation around a vehicle to lane change intended by an occupant, for example.

According to one aspect of the present invention, there is provided a vehicle control device that performs travel control of a vehicle, comprising: a detection unit capable of detecting a situation around the vehicle; and a control unit for controlling the vehicle based on a detection result in the detection unit, wherein based on a fact that lane change of another vehicle that is performed between a first lane in which the vehicle is traveling and a second lane adjacent to the first lane is detected by the detection unit, the control unit changes an operation condition on an occupant for permitting lane change of the vehicle intended by the occupant.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
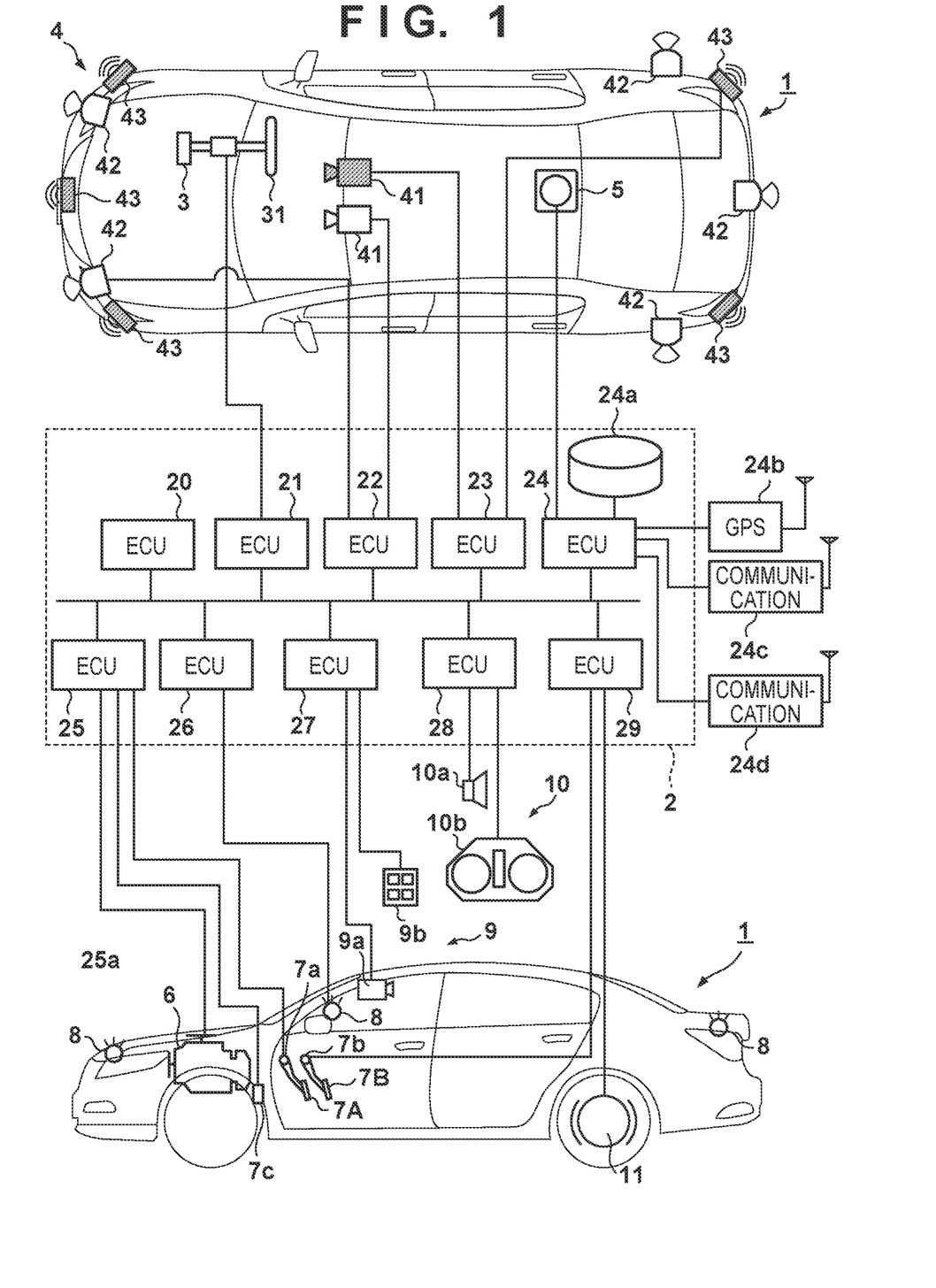
FIG. 1 is a block diagram of a vehicle control device.

FIG. 1 is a block diagram of a vehicle control device according to one embodiment of the present invention. The vehicle control device illustrated in FIG. 1 is a device that controls automated driving of a vehicle 1, and in FIG. 1, an outline of the vehicle 1 is illustrated in a plan view and a side view. The vehicle 1 is a sedan-type four-wheel passenger car as an example.

The control device in FIG. 1 includes a control unit 2. The control unit 2 includes a plurality of ECUs 20 to 29 that are communicably connected by an in-vehicle network. Each of the ECUs includes a processor represented by a CPU, a storage device such as a semiconductor memory, an interface with an external device, and the like. In the storage device, programs executed by the processor, data and the like used in processing by the processor are stored. Each of the ECUs may include a plurality of processors, a plurality of storage devices, a plurality of interfaces and the like.

Hereinafter, functions and the like assigned to the respective ECUs 20 to 29 will be described. Note that the number of ECUs, and functions assigned to the ECUs can be properly designed, and can be more fragmented or integrated than the present embodiment.

The ECU 20 executes control relating to automated driving of the vehicle 1. In the automated driving, at least either one of steering and acceleration/deceleration of the vehicle 1 is automatically controlled. In a control example described later, both of steering, and acceleration/deceleration are automatically controlled.

The ECU 21 controls an electric power steering device 3. The electric power steering device 3 includes a mechanism that steers front wheels in response to a driving operation (steering operation) of a driver to a steering wheel 31. Further, the electric power steering device 3 includes a motor that provides a driving force to assist a steering operation, or automatically steer the front wheels, a sensor that detects a steering angle, and the like. In a case where a driving state of the vehicle 1 is automated driving, the ECU 21 automatically controls the electric power steering device 3 in response to an instruction from the ECU 20, and controls a traveling direction of the vehicle 1.

ECUs 22 and 23 perform control of detection units 41 to 43 that detect a situation around the vehicle 1, and information processing of detection results. The detection unit 41 is a camera that captures a front of the vehicle 1 (hereinafter, may be described as a camera 41), and in the case of the present embodiment, two cameras 41 are provided at a roof front portion of the vehicle 1. By analyzing an image captured by the camera 41, it is possible to extract the outline of the target, and lane division lines (such as white lines) and the like on a road. Thereby, the ECUs 22 and 23 can detect pedestrians and other vehicles, and more specifically, can recognize a pedestrian ahead, types (a large car, a regular car, or the like) of other vehicles (vehicles ahead), road information (a sidewalk, a road shoulder, a traveling road and the like), and an obstruction on the road.

A detection unit 42 is a LIDAR (LIDAR: Light Detection and Ranging (for example, a laser radar), hereinafter, may be described as a LIDAR 42), and detects a target around the vehicle 1 and measures a distance from the target. In the case of the present embodiment, five LIDARs 42 are provided, one at each corner of a front of the vehicle 1, one at a center of a rear, and one on each side of the rear. The detection unit 43 is a millimeter wave radar (hereinafter, may be described as a radar 43), detects a target around the vehicle 1, and measures a distance from the target. In the case of the present embodiment, five radars 43 are provided, one at a center of the front of the vehicle 1, one at each corner of the front, and one at each corner of the rear.

The ECU 22 controls one of the cameras 41 and respective LIDARs 42, and performs information processing of detection results. The ECU 23 controls the other camera 41 and the respective radars 43, and performs information processing of detection results. A pair of devices that detect the situation around the vehicle 1 are included, whereby reliability of the detection result can be increased, and different kinds of detection units such as the cameras, LIDARS and radars are included, whereby an environment around the vehicle can be analyzed from many different angles. Further, the ECU 22 and the ECU 23 can also respectively detect a relative speed of the vehicle 1 and a target based on a distance from the target around the vehicle 1 measured by the LIDARS 42 and the radars 43, and further can also detect an absolute speed of the target around the vehicle 1 based on absolute speed information of the vehicle 1.

An ECU 24 controls a gyro sensor 5, a GPS sensor 24b and a communication device 24c and performs information processing of detection results or a communication result. The gyro sensor 5 detects a rotational movement of the vehicle 1. A course of the vehicle 1 can be determined by a detection result of the gyro sensor 5, a wheel speed and the like. The GPS sensor 24b detects a current position of the vehicle 1. The communication device 24c wirelessly communicates with a server that provides map information and traffic information, and acquires the map information and traffic information. The ECU 24 is accessible to a database 24a of map information constructed in the storage device, and performs a route search from a current location to a destination, and the like. The ECU 24 includes a communication device 24d for vehicle-to-vehicle communication. The communication device 24d performs wireless communication with other surrounding vehicles, and exchanges information among the vehicles.

An ECU 25 controls a power plant 6. The power plant 6 is a mechanism that outputs a drive force to rotate drive wheels of the vehicle 1, and includes an engine and a transmission, for example. The ECU 25 controls an output of the engine in response to a driving operation (an accelerator operation or an acceleration operation) of a driver, which is detected by an operation detection sensor 7a provided at an accelerator pedal 7A, and switches a gear ratio of the transmission based on information on a vehicle speed or the like detected by a vehicle speed sensor 7c, for example. In a case where a driving state of the vehicle 1 is automated driving, the ECU 25 automatically controls the power plant 6 in response to an instruction from the ECU 20, and controls acceleration/deceleration of the vehicle 1.

An ECU 26 controls lamps (headlights, taillights and the like) including a direction indicator 8 (blinker). In the case of an example in FIG. 1, the direction indicator 8 is provided at the front, door mirrors and the rear of the vehicle 1.

An ECU 27 controls a detection unit 9 that detects a situation of an inside of the vehicle and performs information processing of a detection result. As the detection unit 9, a camera 9a that photographs the inside of the vehicle, and an input device 9b that receives an input of information from an occupant inside of the vehicle are provided. In the case of the present embodiment, the camera 9a is provided at a roof front portion of the vehicle 1, and photographs the occupant (for example, the driver) in the vehicle. The input device 9b is a switch group that is disposed in a position operable by the occupant in the vehicle, and gives an instruction to the vehicle 1.

An ECU 28 controls an output device 10. The output device 10 outputs information to the driver, and receives input of information from the driver. An audio output device 10a notifies the driver of information by a sound. A display device 10b notifies the driver of information by display of an image. The display device 10b is disposed on a driver's seat surface, for example, and configures an instrument panel or the like. Note that a sound and display are illustrated here, but information may be notified by vibration and light. Further, information may be notified by combining two or more of a sound, display, vibration and light.

The ECU 29 controls a brake device 11 and a parking brake (not illustrated). The brake device 11 is a disc brake device, for example, is provided at each of the wheels of the vehicle 1, and decelerates or stops the vehicle 1 by adding resistance to rotation of the wheel. The ECU 29 controls an operation of the brake device 11 in response to a driving operation (brake operation) of the driver that is detected by an operation detection sensor 7b provided at a brake pedal 7B, for example. In a case where the driving state of the vehicle 1 is automated driving, the ECU 29 automatically controls the brake device 11 in response to an instruction from the ECU 20, and controls deceleration and stop of the vehicle 1. The brake device 11 and a parking brake are also operated to keep a stopping state of the vehicle 1. Further, in a case where the transmission of the power plant 6 includes a parking lock mechanism, the parking lock mechanism can also be operated to keep the stopping state of the vehicle 1.

In the vehicle 1 configured in this way, during automated driving, auto lane changing (ALC; Auto Lane Changing) that controls automatic lane change of the vehicle 1 while reflecting an intention of an occupant (a driver, for example) is performed. In control of auto lane changing, the ECU 20 automatically performs lane change to a direction desired by an occupant in a case where an intention (action) of the occupant to desire lane change is detected. For example, the ECU 20 performs auto lane changing, in a case where the ECU 26 detects the operation of the direction indicator 8 or the steering wheel 31 by the occupant, in a case where the ECU 27 (camera 9a) detects that line of sight of the occupant is directed for a predetermined time in a direction in which lane change is desired, or in a case where the ECU 27 (camera 9a) detects a gesture of the occupant indicating that the occupant desires lane change, as detection of the intention of the occupant. Note that hereinafter, auto lane changing may be referred to as ALC.

Figure 3:
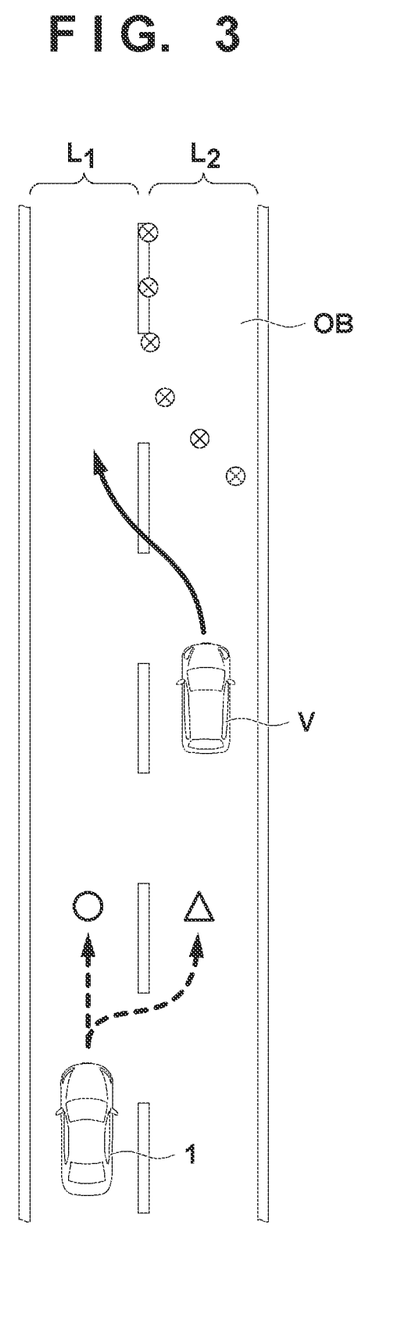
FIG. 3 is a view illustrating an example of lane change.

However, with ALC technology, there may be the case where lane change that reflects the intention of an occupant is not appropriate, such as the case in which although other vehicles perform lane change to avoid an obstruction, the occupant intends to perform lane change to the lane in which the other vehicles were traveling before the lane change. For example, FIG. 3 illustrates an example in which in a case where the self-vehicle 1 is traveling in a first lane L1, another vehicle V performs lane change to the first lane L1 from a second lane L2, in order to avoid an obstruction OB in the second lane L2 adjacent to the first lane L1. As the obstacle OB, lane closure, construction, traffic jam, a falling object or the like is cited, for example. If lane change of the vehicle 1 to the second lane L2 from the first lane L1 is performed in this case, it can be necessary to perform lane change to the first lane L1 from the second lane L2 immediately thereafter.

Therefore, the ECU 20 of the present embodiment changes an operation condition on the occupant to permit lane change of the vehicle 1 intended by the occupant, based on lane change of the other vehicles detected by the detection units 41 to 43. The operation condition is a condition of an operation that should be performed by the occupant to permit implementation of lane change of the vehicle corresponding to the intention of the occupant during control of auto lane changing (ALC), and can include an operation condition of an in-vehicle component that should be performed by the occupant to permit implementation of lane change, in the case of the present embodiment. Note that hereinafter, the "operation condition" may be called a "permission condition".

Figure 2:
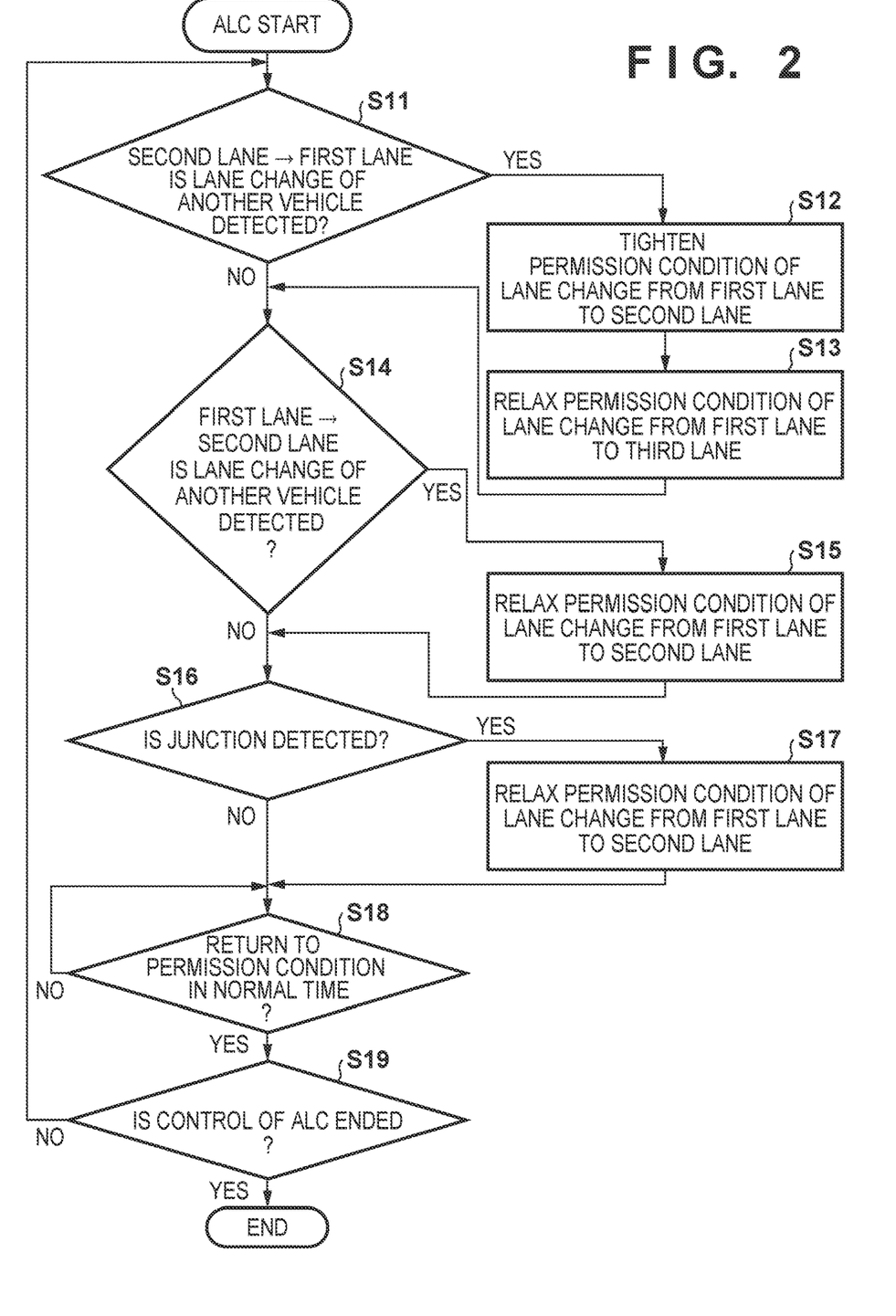
FIG. 2 is a chart illustrating a setting flow of a permission condition of lane change.

Hereinafter, a setting flow of the permission condition of lane change according to the present embodiment will be described with reference to FIG. 2. FIG. 2 is a chart illustrating the setting flow of the permission condition of lane change of the vehicle 1, and respective steps of the setting flow can be performed by the ECU 20. In the following explanation, a lane in which the vehicle 1 in which control of auto lane changing (ALC) is performed is traveling is set as the first lane L1, and lanes adjacent to the first lane L1 are set as the second lane L2 and a third lane L3. Further, the third lane L3 is a lane (that is, a lane adjacent to the first lane L1 on an opposite side to the second lane L2) on an opposite side of the second lane L2 with respect to the first lane L1.

In S11, the ECU 20 determines whether or not lane change of another vehicle V to the first lane L1 from the second lane L2 is detected by the detection units 41 to 43. Here, the other vehicle V the lane change of which is detected may be a number of vehicles that can be detected (recognized) by the detection units 41 to 43. In other words, in S11, the ECU 20 may determine whether lane changes of a plurality of other vehicles V are detected by the detection units 41 to 43. Further, in the present embodiment, the determination condition is the fact that lane change of the single other vehicle V traveling ahead of the self-vehicle 1 is detected, but the determination condition is not limited to this, and may be the fact that lane changes of a predetermined number of other vehicles V (a plurality of other vehicles V, for example) in a predetermined time period. In a case where lane change of the other vehicle V to the first lane L1 from the second lane L2 is detected in S11, the flow advances to S12, and in a case where lane change of the other vehicle V to the first lane L1 from the second lane L2 is not detected, the flow advances to S14.

S12 to S13 are steps of changing the permission condition of ALC in a case where lane change of the other vehicle V to the first lane L1 from the second lane L2 is detected.

In S12, the ECU 20 makes the permission condition of ALC to the second lane L2 from the first lane L1 stricter than at a normal time. For example, in a case where the other vehicle V performs lane change to the first lane L1 from the second lane L2, as illustrated in FIG. 3, there is a possibility that a traveling obstruction such as lane blocking or construction occurs in the second lane L2. Therefore, in a case of detecting lane change of the other vehicle V, the ECU 20 tightens the permission condition of ALC with respect to lane change of the vehicle 1 to the lane (that is, the second lane L2) in which the other vehicle V was traveling before the lane change. That is to say, in a case where the detection units 41 to 43 detect lane change of the other vehicle V to the first lane L1 from the second lane L2, the ECU 20 of the present embodiment tightens the permission condition of ALC with respect to lane change of the vehicle 1 to the second lane L2 from the first lane L1, and makes it difficult to perform lane change to the second lane L2 from the first lane L1 that reflects an intention of the occupant. Note that as a mode of tightening the permission condition of ALC, lane change of the vehicle 1 to the second lane L2 from the first lane L1 may be prohibited.

Figure 4:
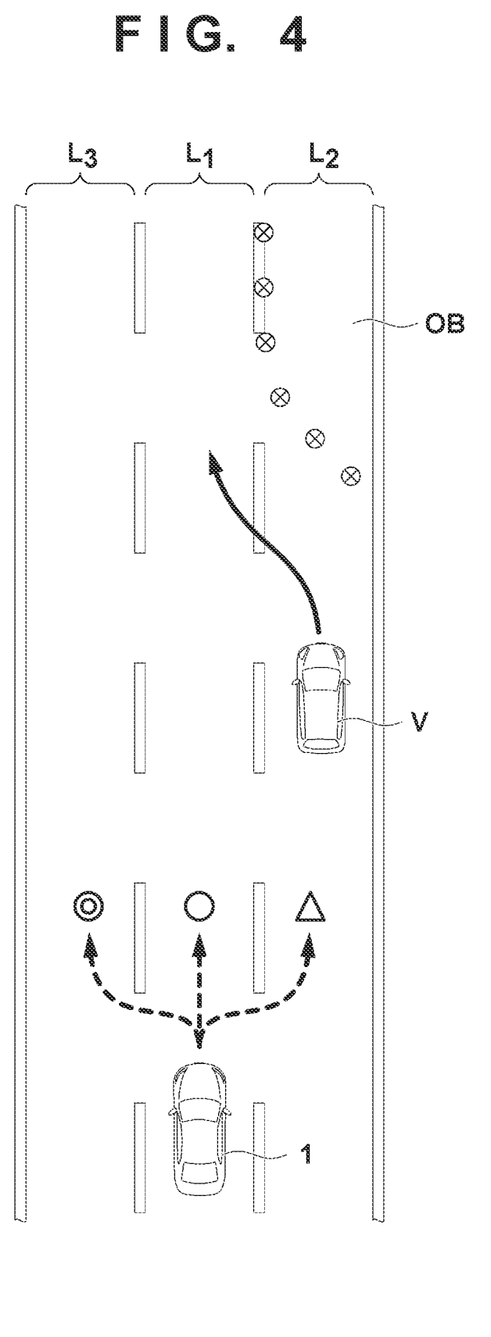
FIG. 4 is a view illustrating an example of lane change.

In S13, in a case where the third lane L3 is present, the ECU 20 relaxes the permission condition of ALC to the third lane L3 from the first lane L1 more than at the normal time. For example, in a case where the other vehicle V performs lane change to the first lane L1 from the second lane L2, there is a high possibility that a traveling obstruction occurs in the second lane L2, as illustrated in FIG. 4, and it can be expected that other vehicles than the other vehicle V the lane change of which is detected also perform lane change to the first lane L1 from the second lane L2. Therefore, the vehicle 1 preferably travels in the third lane L3 on the opposite side to the second lane L2 with respect to the first lane L1 in terms of safety. In other words, in a case where the detection units 41 to 43 detect lane change of the other vehicle V to the first lane L1 from the second lane L2, the ECU 20 of the present embodiment relaxes the permission condition of ALC concerning lane change of the vehicle 1 to the third lane L3 from the first lane L1, and makes it easy to perform lane change to the third lane L3 from the first lane L1 that reflects the intention of the occupant.

Here, the ECU 20 may determine whether it is possible to reach a destination in a case where lane change is performed to the third lane L3, and may change the permission condition of ALC to the third lane L3 based on a result of the determination. In a case where the ECU 20 determines that it is possible to reach the destination even when lane change is performed to the third lane L3, for example, the ECU 20 relaxes the permission condition of ALC to the third lane L3 more than at the normal time. On the other hand, in a case where the ECU 20 determines that it is impossible to reach the destination when lane change is performed to the third lane L3, the ECU 20 tightens the permission condition of ALC to the third lane L3 more than at the normal time, or maintains the permission condition as it is at the normal time.

In S14, the ECU 20 determines whether or not lane change of the other vehicle V to the second lane L2 from the first lane L1 is detected by the detection units 41 to 43. In a case where lane change of the other vehicle V to the second lane L2 from the first lane L1 is detected, the ECU 20 advances to S15, and in a case where lane change of the other vehicle V to the second lane L2 from the first lane L1 is not detected, the ECU 20 advances to S16.

Figures 5, 6:
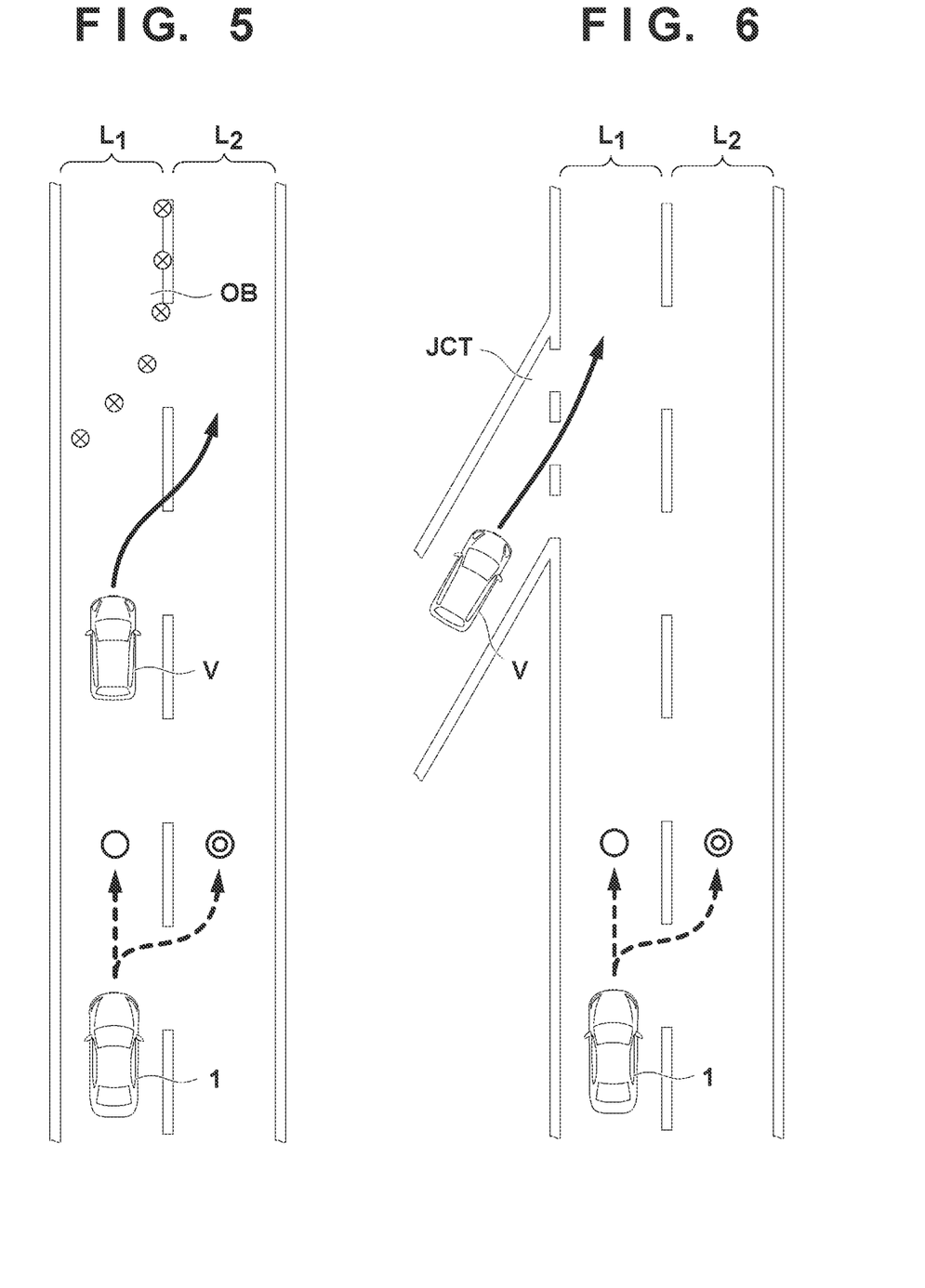
FIG. 5 is a view illustrating an example of lane change.
FIG. 6 is a view illustrating an example of lane change.

S15 is a step of changing the permission condition of ALC in a case where lane change of the other vehicle V to the second lane L2 from the first lane L1 is detected. In S15, the ECU 20 relaxes the permission condition of ALC to the second lane L2 from the first lane L1 more than at the normal time. For example, in a case where the other vehicle V performs lane change to the second lane L2 from the first lane L1, there is a possibility that a travel obstruction such as lane closure or construction occurs in the first lane L1, as illustrated in FIG. 5. Therefore, in a case where lane change of the other vehicle V is detected, the ECU 20 relaxes the permission condition of ALC concerning lane change of the vehicle 1 to a lane (that is, the second lane L2) in which the other vehicle V is traveling after the lane change. In other words, in a case where the detection units 41 to 43 detect lane change of the other vehicle V to the second lane L2 from the first lane L1, the ECU 20 of the present embodiment relaxes the permission condition of ALC concerning lane change of the vehicle 1 to the second lane L2 from the first lane L1, and makes it easy to perform lane change to the second lane L2 from the first lane L1 that reflects the intention of the occupant.

In S16, the ECU 20 determines whether or not a junction JCT that joins the first lane L1 in which the vehicle 1 is traveling is detected by the detection units 41 to 43. The junction JCT is not limited to a junction to the first lane L1 from another road, but can include a junction from an interchange (IC), a junction from the interchange (IC), a parking area (PA) or the like. In a case where the junction JCT is detected, the flow advances to S17, and in a case where the junction JCT is not detected, the flow advances to S18.

S17 is a step of changing the permission condition of ALC in a case where the junction JCT to the first lane L1 is detected. In S17, the ECU 20 relaxes the permission condition of ALC to the second lane L2 from the first lane L1 more than at the normal time. For example, in a case where the junction JCT is detected, as illustrated in FIG. 6, there is a possibility that the other vehicle V joins the first lane L1 from the junction JCT, and in order for the other vehicle V to join the first lane L1 smoothly, lane change of the vehicle 1 to the second lane L2 from the first lane L1 is preferably performed. Therefore, in a case where the junction JCT is detected, the ECU 20 of the present embodiment relaxes the permission condition of ALC concerning lane change of the vehicle 1 to the second lane L2 from the first lane L1, and makes it easy to perform lane change to the second lane L2 from the first lane L1 that reflects the intention of the occupant. Here, in a case where the permission condition is relaxed in the step S15, the ECU 20 may set a permission condition of ALC in S17 so that the condition is further relaxed with respect to the permission condition of ALC that is set in the step S15.

In S18, the ECU 20 determines whether or not to return the permission condition to the permission condition of ALC in the normal time. For example, the ECU 20 determines whether or not the vehicle 1 passes through a place where an obstruction occurs such as lane closure or construction based on the detection result in the detection units 41 to 43, and may determine to return the permission condition to the permission condition of ALC in the normal time in a case where the vehicle 1 passes through the place. Further, in a case where a predetermined time period set in advance elapses after the ECU 20 changes the permission condition of ALC, or in a case where the vehicle 1 travels a predetermined distance set in advance, the ECU may decide to return the permission condition of ALC to the permission condition of ALC in the normal time. In a case where the ECU 20 determines to return the permission condition of ALC to the permission condition of ALC in the normal time, the flow advances to S19 after returning the permission condition of ALC to the permission condition of ALC in the normal time. On the other hand, in a case where the ECU 20 determines not to return the permission condition of ALC to the permission condition of ALC in the normal time yet, the ECU 20 repeatedly performs S18. Note that when the ECU 20 does not change the permission condition of ALC in the steps S11 to S17, the ECU 20 advances to S19 without performing the step S18.

In S19, the ECU 20 determines whether or not to end control of auto lane changing (ALC). For example, the ECU 20 may determine to end control of ALC, in a case where an instruction to end control of ALC is received via the input device 9b from the occupant, in a case where the vehicle 1 reaches the destination, or in a case where the power plant 6 (engine) is stopped. Further, in a case where the vehicle 1 exits a predetermined area (ALC corresponding area) in which control of ALC is performed, such as a highway, the ECU 20 may determine to end control of ALC.

Here, an example of changing the permission condition of ALC will be described. For example, as the permission condition of ALC, changing the operation mode of the direction indicator 8 for permitting ALC is cited. In a case where ALC is permitted when an operation of the direction indicator 8 is performed for one second in the normal time (reference time), the operation time period of the direction indicator 8 as the permission condition of ALC is made longer than at the normal time in a case of tightening the permission condition of ALC. Specifically, in a case where the operation of the direction indicator 8 is performed for two seconds which is longer than at the normal time, ALC is permitted. On the other hand, in a case where the permission condition of ALC is relaxed, the operation time period of the direction indicator 8 as the permission condition of ALC is made shorter than at the normal time. Specifically, in a case where the operation of the direction indicator 8 is performed for 0.5 seconds which is shorter than at the normal time, ALC is permitted.

Further, as the permission condition of ALC, an operation stroke of the direction indicator 8 may be changed. In a case where ALC is permitted when the operation lever of the direction indicator 8 moves in a first stroke in the normal time, the permission condition of ALC is tightened so that ALC is permitted when the operation lever of the direction indicator 8 moves in a second stroke that is larger than the first stroke. On the other hand, the permission condition of ALC is relaxed so that ALC is permitted when the operation lever of the direction indicator 8 moves in a third stroke that is smaller than the first stroke. Specifically, in a case where the first stroke is a stroke to a position (also referred to as a butt position) where the operation lever of the direction indicator 8 is held in a moved state, the second stroke can be set to a stroke in which the operation lever is more pushed in than in the first stroke. The third stroke can be set at a stroke to a position (also referred to as a one-touch position) in which the direction indicator 8 starts reaction.

Further, as the permission condition of ALC, a line of sight, a gesture, a voice or the like of the occupant may be used. For example, in a case of changing, as the permission condition of ALC, a time period in which the line of sight of the occupant is directed to a direction in which lane change is desired, the permission condition of ALC is tightened so that a detection time period of the line of sight of the occupant directed to the direction in which the lane change is desired is made longer than at the normal time. On the other hand, the permission condition of ALC is relaxed so that the detection time period of the line of sight of the occupant which is directed to the direction in which the lane change is desired is made shorter than at the normal time. Further, in a case of changing, as the permission condition of ALC, the gesture or the voice of the occupant, the permission condition of ALC is tightened so that the gesture or the voice of the occupant is more complicated than at the normal time. On the other hand, the permission condition of ALC is relaxed so that the gesture or the voice of the occupant is made simpler than at the normal time.

Here, an operation load of the in-vehicle component may be changed between the case where the permission condition of ALC is tightened and the case where the permission condition of ALC is relaxed. Specifically, the permission condition of ALC is tightened so that an operation reaction force of the operation component is made heavier than at the normal time (namely, the operation load of the operation component is made heavier than at the normal time). On the other hand, the permission condition of ALC is relaxed so that the operation reaction force of the operation component is made lighter than at the normal time (namely, the operation load of the operation component is made lighter than at the normal time). As the in-vehicle component the operation load of which is changed, the direction indicator 8 is cited, for example.

As described above, in the present embodiment, in auto lane changing (ALC) that controls lane change of the vehicle 1 while reflecting the intention of the occupant, the permission condition of ALC is changed based on lane change of the other vehicle V detected by the detection units 41 to 43. Thereby, when lane change reflecting the intention of the occupant is not appropriate, the lane change is made difficult to perform, and thereby the self-vehicle 1 can be caused to travel in the suitable lane.

Other Embodiments

Figure 7:
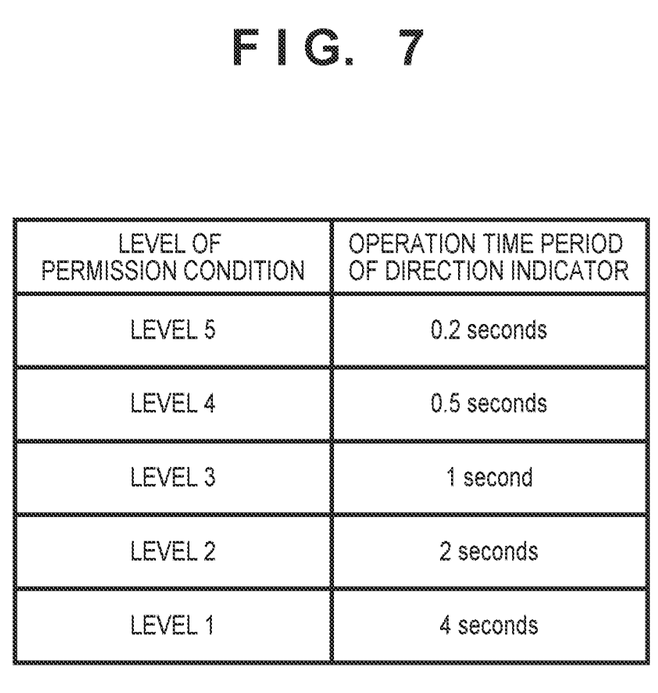
FIG. 7 is a diagram illustrating permission conditions of lane change according to a plurality of levels.

As a specific example concerning change of the permission condition of ALC, for example, the ECU 20 sets the permission condition of ALC at a plurality of levels in advance, and the permission condition of ALC may be changed by changing the levels. FIG. 7 illustrates an example of the plurality of levels concerning the permission condition of ALC. In the example illustrated in FIG. 7, the operation time period of the direction indicator 8 is used as the permission condition of ALC, and the permission condition of ALC is set at five levels of levels 1 to 5. Level 3 is the permission condition of ALC in the normal time. When the permission condition of ALC is made strict, the level is changed to increase the operation time period of the direction indicator 8 as the permission condition of ALC. On the other hand, when the permission condition of ALC is relaxed, the level is changed to shorten the operation time period of the direction indicator 8 as the permission condition of ALC.

Further, when the permission condition of ALC is changed, the ECU 20 may notify the occupant that the permission condition of ALC is changed via the output device 10. For example, when the permission condition of ALC is set at the plurality of levels as described above, the ECU 20 can notify the occupant of the current level concerning the permission condition of ALC by the audio output device 10a, the display device 10b or the like as the output device 10. Thereby, the occupant can grasp that the lane change of the vehicle 1 corresponding to the intention of the occupant is limited.

Further, in the above described embodiment, the example of changing the permission condition of ALC based on lane change of the other single vehicle is described, but the present invention is not limited to the example. For example, a mode may be adopted, in which when a plurality of other vehicles continuously perform lane change, the permission condition of ALC is changed based on the lane change. Thereby, lane change of the vehicle 1 reflecting the intention of the occupant can be performed more appropriately.

Summary of Embodiments

1. A vehicle control device of the above described embodiment
is a vehicle control device that performs travel control of a vehicle (1, for example), and includes
a detection unit (41 to 43, for example) capable of detecting a situation around the vehicle, and
a control unit (20, for example) that controls the vehicle based on a detection result in the detection unit
wherein the control unit changes a permission condition of lane change of the vehicle, based on that lane change of another vehicle (V, for example) that is performed between a first lane (L1, for example) in which the vehicle is traveling and a second lane (L2, for example) adjacent to the first lane is detected by the detection unit.

According to the embodiment, it becomes possible to control lane change of the vehicle so as to recommend suitable lane change, or not to recommend unsuitable lane change, based on lane change of another vehicle, and cause a self-vehicle to travel in a suitable lane.

2. In the above described embodiment,
based on lane change of another vehicle that is detected by the detection unit, the control unit tightens the permission condition concerning lane change of the vehicle to a lane in which the other vehicle is traveling before the lane change.

According to the embodiment, it is made difficult to perform lane change to the lane in which another vehicle is traveling before lane change, and it is possible to recommend travel of the self-vehicle in a suitable lane.

3. In the above described embodiment,
in a case where the detection unit detects that another vehicle performs lane change to the first lane from the second lane, the control unit tightens the permission condition concerning lane change of the vehicle to the second lane from the first lane.

According to the embodiment, it becomes possible to make unsuitable lane change difficult, such as lane change to the lane in which another vehicle is traveling before lane change, regardless of the other vehicle performing the lane change to avoid an obstruction, and to recommend travel of the self-vehicle in a suitable lane.

4. In the above described embodiment,
in a case where the detection unit detects that another vehicle performs lane change to the first lane from the second lane, the control unit relaxes the permission condition concerning lane change of the vehicle to a third lane (L3, for example) on an opposite side to the second lane with respect to the first lane.

According to the embodiment, by making it easy to perform lane change to the third lane on the opposite side to the second lane having a possibility that an obstruction occurs, lane change of other vehicles to the first lane from the second lane is smoothly performed, and it becomes possible to enhance safety.

5. In the above described embodiment, in a case where the detection unit detects that another vehicle performs lane change to the first lane from the second lane, the control unit changes the permission condition of lane change of the vehicle to a third lane, based on a result of determining whether or not the vehicle can reach a destination when performing lane change to the third lane on an opposite side to the second lane with respect to the first lane.

According to the embodiment, it is possible to avoid a situation where the vehicle cannot reach the destination by lane change.

6. In the above described embodiment, based on lane change of another vehicle detected by the detection unit, the control unit relaxes the permission condition concerning lane change of the vehicle to a lane in which the other vehicle is traveling after the lane change.

According to the embodiment, it is made easy to perform lane change to the lane in which the other vehicle is traveling after lane change, and it becomes possible to recommend travel of the self-vehicle in a suitable lane.

7. In the above described embodiment, in a case where the detection unit detects that another vehicle performs lane change from the first lane in which the vehicle is traveling to the second lane adjacent to the first lane, the control unit relaxes the permission condition concerning lane change of the vehicle to the second lane from the first lane.

According to the embodiment, it is made easy to perform suitable lane change in such a manner that lane change is performed to the lane in which another vehicle is traveling after lane change, in response to that the other vehicle performs the lane change to avoid an obstruction, and it becomes possible to recommend travel of the self-vehicle in a suitable lane.

8. In the above described embodiment, in a case where the detection unit detects a junction (JCT, for example) that joins the first lane in which the vehicle is traveling, the control unit relaxes the permission condition concerning lane change of the vehicle to the second lane adjacent to the first lane from the first lane.

According to the embodiment, by making it easy to perform lane change to the second lane adjacent to the first lane, from the first lane in which the vehicle 1 is traveling at present, other vehicles smoothly join the first lane from the junction, and it becomes possible to enhance safety.

9. In the above described embodiment, the control unit notifies that the permission condition is changed.

According to the embodiment, the occupant is enabled to grasp what state the permission condition of lane change is in at present.

10. In the above described embodiment, the permission condition is a condition for permitting lane change of the vehicle corresponding to the intention of the occupant, during control of auto lane changing of the vehicle by the control unit.

According to the embodiment, in auto lane changing (ALC) corresponding to the intention of the occupant, in the case where lane change that reflects the intention of the occupant is unsuitable, the lane change is made difficult to perform, and thereby the self-vehicle is enabled to travel in a suitable lane.

The invention is not limited to the foregoing embodiments, and various variations/changes are possible within the spirit of the invention.

What is claimed is:

1. A vehicle control device that performs travel control of a vehicle, comprising:
   a detector configured to detect a situation around the vehicle; and
   a controller configured to control the vehicle based on a detection result in the detector,
   wherein the detector is configured to detect a lane change of another vehicle between a first lane in which the vehicle is traveling and a second lane adjacent to the first lane, and
   wherein the controller is configured to change an operation condition in accordance with whether the lane change of another vehicle detected by the detector is a lane change from the first lane to the second lane or a lane change from the second lane to the first lane, the operation condition being a condition of an operation that should be performed by an occupant of the vehicle in a case where the occupant requests a lane change of the vehicle from the first lane to another lane.

2. The vehicle control device according to claim 1, wherein the controller is configured to, in accordance with the lane change of another vehicle detected by the detector, tighten the operation condition for the lane change of the vehicle to a lane in which the other vehicle has been traveling before the lane change of the other vehicle.

3. The vehicle control device according to claim 1, wherein in a case where the detector detects that another vehicle performs lane change to the first lane from the second lane, the controller is configured to tighten the operation condition for lane change of the vehicle to the second lane from the first lane.

4. The vehicle control device according to claim 1, wherein in a case where the detector detects that another vehicle performs lane change to the first lane from the second lane, the controller is configured to relax the operation condition for lane change of the vehicle to a third lane on an opposite side to the second lane with respect to the first lane.

5. The vehicle control device according to claim 1, wherein in a case where the detector detects that another vehicle performs lane change to the first lane from the second lane, the controller is configured to change the operation condition for lane change of the vehicle to a third lane on an opposite side to the second lane with respect to the first lane, in accordance with a result of determining whether or not the vehicle can reach a destination when performing lane change to the third lane.

6. The vehicle control device according to claim 1, wherein the controller is configured to, in accordance with the lane change of another vehicle detected by the detector, relax the operation condition for lane change of the vehicle to a lane in which the other vehicle has been traveling after the lane change of the other vehicle.

7. The vehicle control device according to claim 1, wherein in a case where the detector detects that another vehicle performs lane change to the second lane from the first lane, the controller is configured to relax the operation condition for lane change of the vehicle to the second lane from the first lane.

8. The vehicle control device according to claim 1, wherein in a case where the detector detects a junction that joins the first lane, the controller is configured to relax the operation condition for lane change of the vehicle to the second lane from the first lane.

9. The vehicle control device according to claim 1, wherein the controller is configured to notify that the operation condition is changed.

\* \* \* \* \*